May 19, 1936.  J. M. MASLOWSKI  2,041,615
ADJUSTABLE SEAT
Filed Oct. 22, 1934  2 Sheets-Sheet 1

Inventor
John M. Maslowski
By Henry Fuchs Atty.

May 19, 1936.         J. M. MASLOWSKI         2,041,615
ADJUSTABLE SEAT
Filed Oct. 22, 1934         2 Sheets-Sheet 2
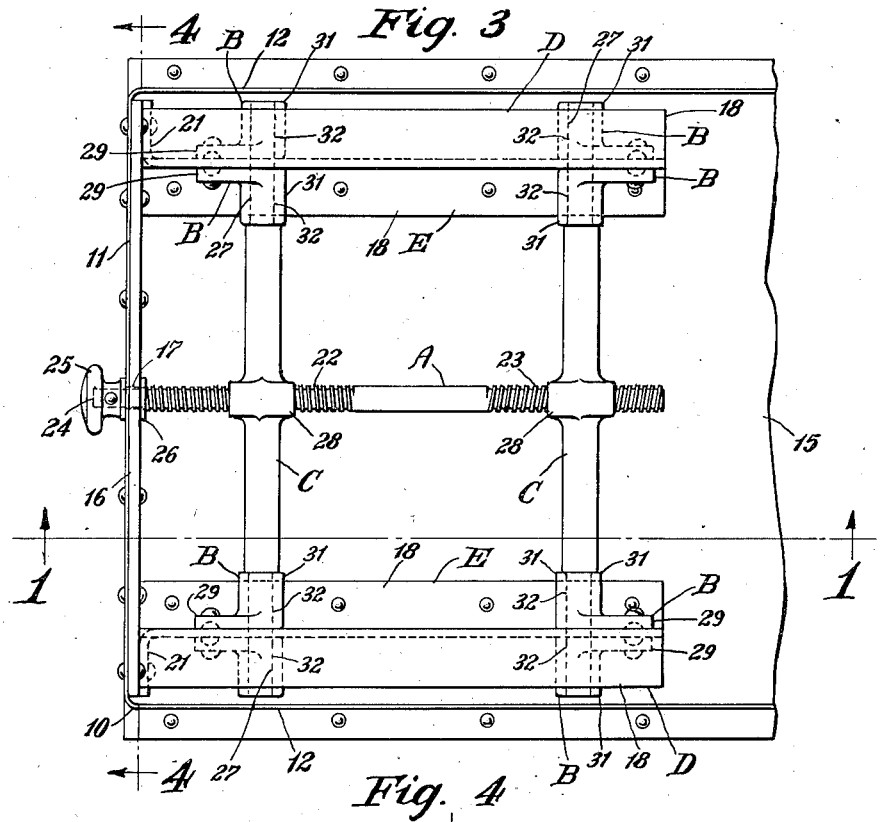
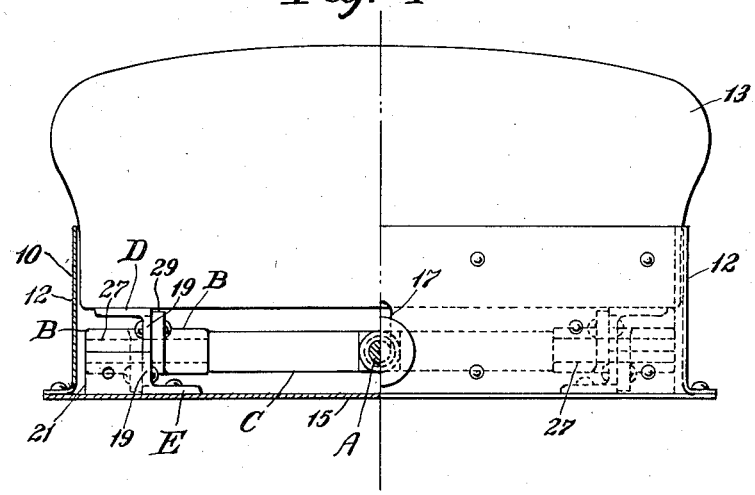
Inventor
John M. Maslowski
By Henry Fuchs Atty.

Patented May 19, 1936

2,041,615

UNITED STATES PATENT OFFICE 2,041,615

ADJUSTABLE SEAT

John M. Maslowski, Chazy, N. Y.

Application October 22, 1934, Serial No. 749,331

1 Claim. (Cl. 155—91)

This invention relates to improvements in adjustable seats for motor vehicles.

One object of the invention is to provide an adjustable seat for the driver of a motor vehicle, wherein mechanism of simple and rugged design is employed for raising or lowering the seat, as desired, to suit the requirements of the driver.

Another object of the invention is to provide a seat adjusting mechanism of the character described in the preceding paragraph, which is easily accessible for operation by the driver of the vehicle while seated.

A more specific object of the invention is to provide a seat raising and lowering mechanism so designed as to effectively hold the seat against rocking or tilting in all the different positions of adjustment thereof.

Other objects of the invention will more clearly appear from the description and claim hereinafter following.

Figure 1:
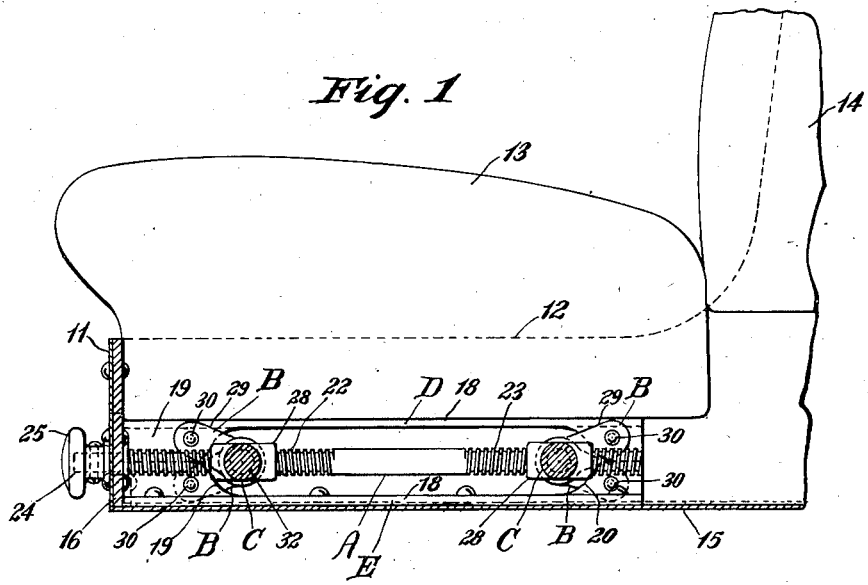
Figure 2:
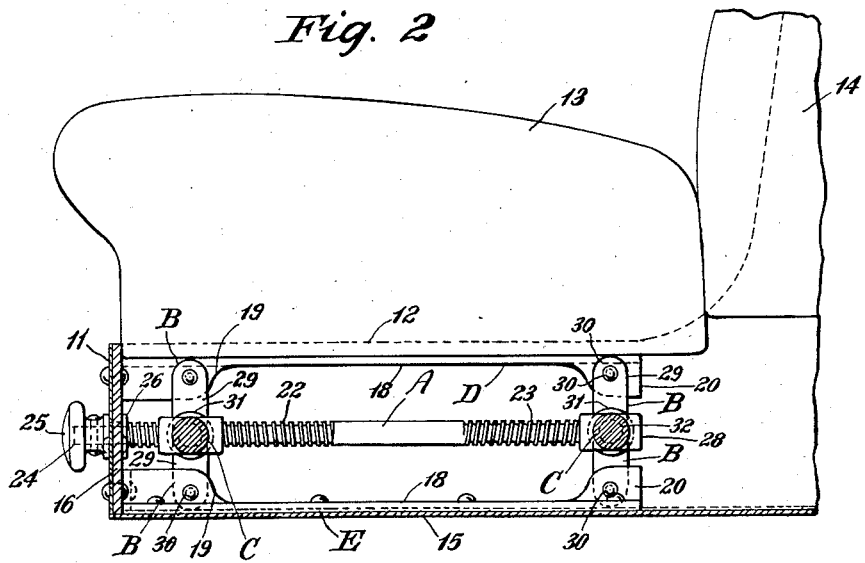

In the drawings forming a part of this specification, Figure 1 is a longitudinal, vertical, sectional view, partly broken away, of the seat structure of a motor vehicle, corresponding substantially to the line 1—1 of Figure 3, said view showing the back rest and seat cushions in side elevation. Figure 2 is a view similar to Figure 1, but showing the parts in a different position. Figure 3 is a plan view of the structure illustrated in Figure 1, with the seat and back rest cushions removed. Figure 4 is a part front elevational and part transverse vertical sectional view of the seat structure shown in Figure 1, looking from left to right in said last named figure, the seat cushion being shown in front elevation.

In said drawings, the frame structure of the seat is indicated by 10. The frame structure comprises a front wall, side walls, and a rear wall, said rear wall not being shown and the front wall and side walls being indicated by 11 and 12, respectively, in the drawings. The usual removable seat and back rest cushion members 13 and 14 are mounted within the frame 10.

My improvements comprise broadly a rotatable adjusting shaft or screw A; two sets of front toggle links B—B and B—B, two sets of rear toggle links B—B and B—B; front and rear transverse rods C—C respectively connecting the front and rear sets of toggle links to the adjusting shaft A; a pair of supporting bars D—D for the seat cushion connected to the upper members of the sets of toggle links; and a pair of base bars E—E connected to the lower members of said sets of toggle links.

In carrying out my invention I preferably provide a base plate 15, which forms a part of the seat structure, and to which the frame structure comprising the front wall 11, the side walls 12—12, and the usual back wall, not shown, is secured in any suitable manner. As shown, the side walls 12—12 are provided with bottom flanges which may be riveted to said base plate 15. At the front end of the base plate 15 is a vertically disposed upstanding fixed plate 16, which, as shown, is riveted to the wall 11. The plate 16 is also secured to the plate 15 through the medium of the base bars E—E, as hereinafter pointed out. The plate 16, as shown, is arranged on the inner side of the wall 10 and has a vertical slot or opening 17 therethrough. As will be understood, the front wall 11 also has an opening registering with the opening 17. The slot or opening 17 accommodates the outer end of the shaft A for vertical movement, as hereinafter pointed out. The base bars E—E are mounted at opposite sides of the seat structure on the base plate 15. Each bar E comprises a flat section 18 riveted to said base plate. At the front and rear ends of said bar E along the inner edge thereof, relatively short upstanding flanges 19 and 20 are provided. The front flanges 19—19 have angular extensions 21—21, which are secured to the plate 16. The bars E—E thus serve to rigidly secure the plate 16 to the plate 15.

The adjusting shaft or screw A is provided with a right hand threaded section 22 at the front end portion thereof and a left hand threaded section 23 at its rear end. The front end of the shaft is extended beyond the threads 22, as indicated at 24, said extended portion projecting through and being guided within the slot 17 of the plate 16. An operating knob or grip 25 is fixed to the extension 24 of the shaft, the same being preferably secured by a rivet extending through the hub of the knob and the shaft A. The hub of the knob 25 bears on the outer side of the wall 10 of the seat frame structure and a collar 26 rigid with the shaft bears on the inner side of the plate 16. As will be evident, the shaft is thus held against endwise displacement with respect to the plate 16 by the knob 25 and the collar 26. The transverse front and rear rods C—C have journal portions 27—27 and 27—27 at opposite ends thereof. Each rod C also has an enlarged section 28 through which the shaft A extends. Each section 28 is in the form of an internally threaded sleeve or nut. The internal threads of the section 28 of the front rod are right hand and cooperate with the right hand threads 22 of the shaft A, while the internal threads of the section 28 of the rear rod are left hand and cooperate with the left hand threads 23 of said shaft.

The toggle links of the front sets B—B and B—B and of the rear sets B—B and B—B are all of like design, each link comprising an arm 29 having a pivot pin opening 30 at one end and a cylindrical boss 31 at the other end thereof projecting at right angles to said arm. The boss 31 is provided with an axial bearing opening 32 adapted to receive the corresponding cylindrical journal portion 27 at one end of one of the rods C. The lower members of the front and rear sets of toggle links at each side of the seat are pivoted at their outer ends to the front and rear upstanding flanges 19 and 20, respectively, of the corresponding bar E by means of pivot elements extending through said flanges and the pivot openings 30—30 of said links. The upper members of the front and rear sets of toggle links at each side of the seat are pivoted at their outer ends to the corresponding supporting bar D. Each bar D comprises a flat section similar to the section 18 of the bar E, also designated by 18. The bars D—D have depending front and rear flanges similar to the flanges 19 and 20 of the bars E—E, also designated by 19 and 20. The bars D—D are reversely arranged to the bars E—E with the flanges 19 and 20 of each bar D in vertical alignment with the flanges 19 and 20 of the corresponding bar E. As most clearly shown in Figures 3 and 4, the upper members B—B and B—B of the sets of toggle links are reversely arranged to the lower members B—B and B—B, so that the hubs thereof extend in opposite directions. The hubs of the top and bottom members of the front sets are in axial alignment and rotatably accommodate the journal portions 27—27 at opposite ends of the rod C at the front of the seat. The hubs of the top and bottom members of the rear sets of links are also in axial alignment and receive the journal portions 27—27 at opposite ends of the rod C at the rear of the seat. The pivotal connection between the bars D—D and the upper toggle link members B—B and B—B of the front and rear sets of links is provided by pivot elements extending through the flanges 19 and 20 of said bars and the pivot openings 30—30 at the upper ends of said links.

As will be evident the bars D—D directly support the seat cushion 13, whereby the seat cushion is raised and lowered with said bars, thus adjusting the height of the seat.

It is further pointed out that when the seat is lowered to the position shown in Figure 1, the depending flanges 19 and 20 of the supporting bars D—D engage with the upper edges of the flanges 19 and 20 of the base bars E—E, thereby limiting relative approach of said bars D—D and E—E and arresting swinging movement of the toggle links with the pivots 30—30 of the upper and lower members of each set of toggle links B—B vertically separated, so that there will be no danger of the operating parts becoming jammed, which might otherwise occur if the pivots of the toggle links were permitted to move to a position in horizontal alignment with the axis of the journal portions 27—27 of the corresponding rod C.

In operating my improved raising and lowering mechanism for the driver's seat of a motor vehicle, assuming that the seat is in the lowered position shown in Figure 1, the operator rotates the bar A in a right hand direction through the medium of the knob 25 thereof, thereby causing the rods C—C to move laterally apart. This movement of the rods C—C causes the toggle links B—B and B—B of the front and rear sets to straighten out until they finally assume the position shown in Figure 2, wherein the seat is illustrated as raised to its maximum height of adjustment. In lowering the seat, the operator turns the shaft in a left hand direction by means of the knob 25, thereby causing the rods C—C to laterally approach each other and effecting a corresponding swinging movement of the members B—B of the toggle links with consequent lowering of the seat. This lowering action may be continued until the parts assume the positions shown in Figure 1, wherein the seat is illustrated as lowered to the limit of its adjustment. As hereinbefore pointed out in connection with the description of the operating mechanism, the flanges 19 and 20 of the supporting bars D—D will engage with the upper edges of the flanges 19 and 20 of the base bars E—E, thereby positively arresting movement of the parts as illustrated in Figure 1 and preventing the toggle links from being completely folded. As hereinbefore explained, the separated position of the pivots at the outer ends of the upper and lower arms B—B of the toggle links prevents jamming of the parts and assures immediate and easy adjustment through the medium of the rotary operating shaft A and the toggle links B—B when the shaft A is rotated.

I have herein shown and described what I now consider the preferred manner of carrying out my invention, but the same is merely illustrative and I contemplate all changes and modifications that come within the scope of the claim appended hereto.

I claim:

In an adjustable seat, the combination with a base member; of seat supporting means above said base member; front and rear sets of toggle links at each side of the base, each set comprising a barlike upper link pivoted to said supporting means, and a barlike lower link pivoted to said base member, the bars of each set of links having aligned, laterally projecting sleeve-like bearing members at their inner ends, adapted to receive pivot means for swingingly connecting said links; a transverse front pivot shaft extending through the bearing openings of the sleeves of said front sets for pivotally connecting the links of each set to each other, and connecting said sets for simultaneous operation; a transverse rear pivot shaft extending through the bearing openings of the sleeves of said rear sets of links for pivotally connecting the links of each set to each other, and for connecting said rear sets for simultaneous operation; and screw means for displacing said shafts with respect to each other to operate all of said sets of links simultaneously.

JOHN M. MASLOWSKI.